United States Patent
Kerns et al.

(10) Patent No.: US 6,430,185 B1
(45) Date of Patent: Aug. 6, 2002

(54) APPARATUS AND METHOD FOR BIDIRECTIONAL DATA TRANSFER

(75) Inventors: Daniel J. Kerns; Joe D. Marchionni, both of Petaluma, CA (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 08/997,341

(22) Filed: Dec. 23, 1997

(51) Int. Cl.[7] .............................. H04L 12/28; H04J 3/16
(52) U.S. Cl. ................. 370/395.1; 370/401; 370/466; 370/352; 725/111
(58) Field of Search ............................... 370/352, 353, 370/354, 395, 397, 401, 405, 466, 469, 389, 392, 395.1, 395.2, 419; 725/111, 109, 122

(56) References Cited

U.S. PATENT DOCUMENTS

| | | | | |
|---|---|---|---|---|
| 5,488,412 A | * | 1/1996 | Majeti et al. | 348/10 |
| 5,534,913 A | | 7/1996 | Majeti et al. | 348/7 |
| 5,544,161 A | * | 8/1996 | Bigham et al. | 370/397 |
| 5,544,164 A | * | 8/1996 | Baran | 370/397 |
| 5,734,652 A | * | 3/1998 | Kwok | 370/395 |
| 5,883,907 A | * | 3/1999 | Hoekstra | 714/784 |
| 6,041,051 A | * | 3/2000 | Doshi et al. | 370/352 |
| 6,049,531 A | * | 4/2000 | Roy | 370/260 |

* cited by examiner

*Primary Examiner*—Chau Nguyen
*Assistant Examiner*—Chi Ho A. Lee
(74) *Attorney, Agent, or Firm*—Jackson Walker LLP; Richard A. Mysliwiec; V. Lawrence Sewell

(57) ABSTRACT

A system (210) for facilitating bidirectional data transfer between a customer premises equipment (212) and information service providers (228A–N) includes a channel service unit (258) which receives packets of data from the information service providers (228A–N), and passes the packets of data to a router (256). The router (256) segregates the packets of data based on which customer premises equipment (212) is destined to receive the packets of data. An asynchronous transfer mode (ATM) adapter (264) converts the packets of data to an ATM cell, and an ATM modulator (266) synchronizes the ATM cell to facilitate transmission over an ATM broadband network (232). The particular packets of data provided by the information service providers are selected in response to a user request sent by the customer premises equipment (212) via the ATM broadband network (232) and transferred to the information service providers (228A–N) through the ATM modulator (266), the ATM adaptor (264), the router (256), and the channel service unit (258).

17 Claims, 3 Drawing Sheets

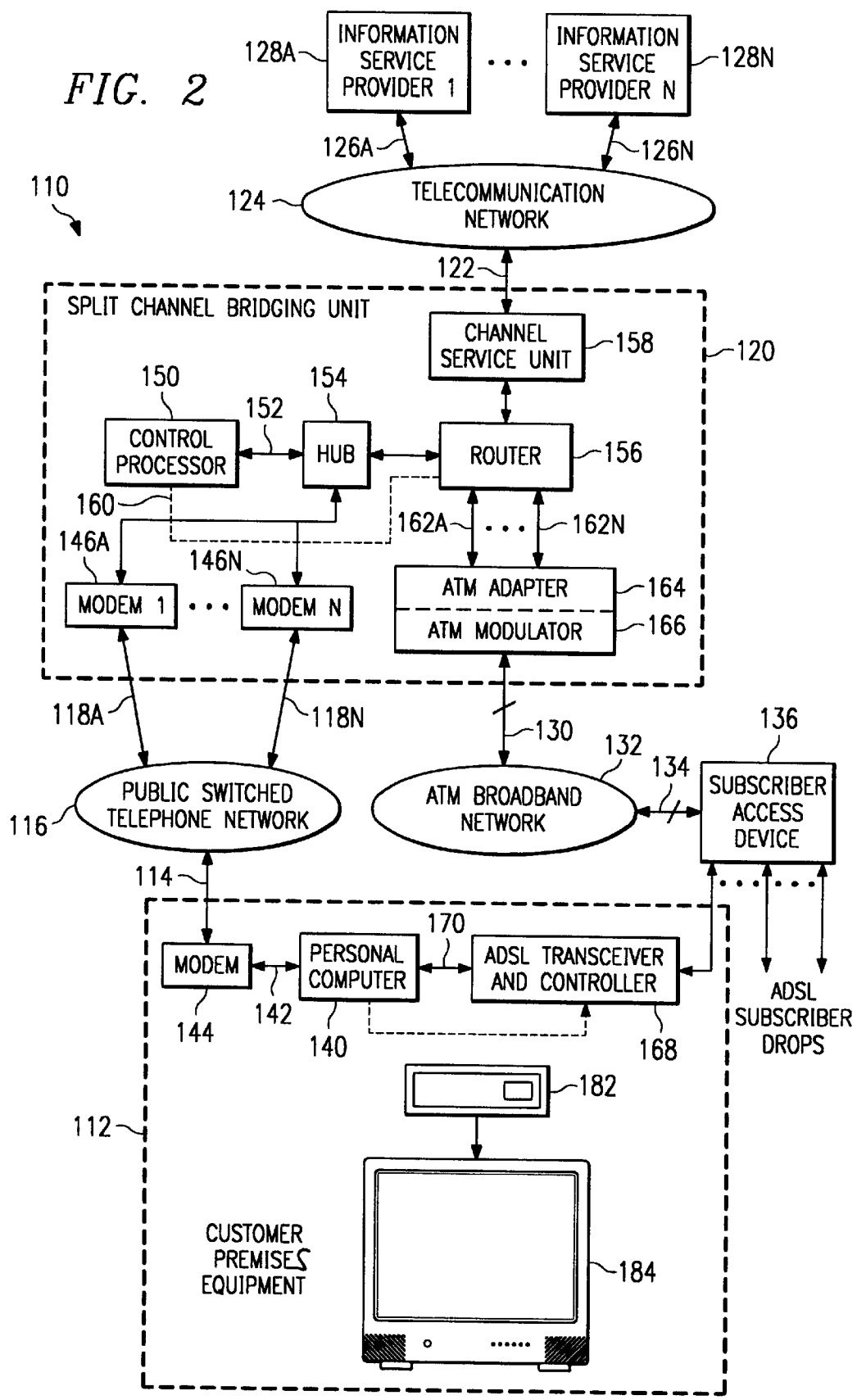

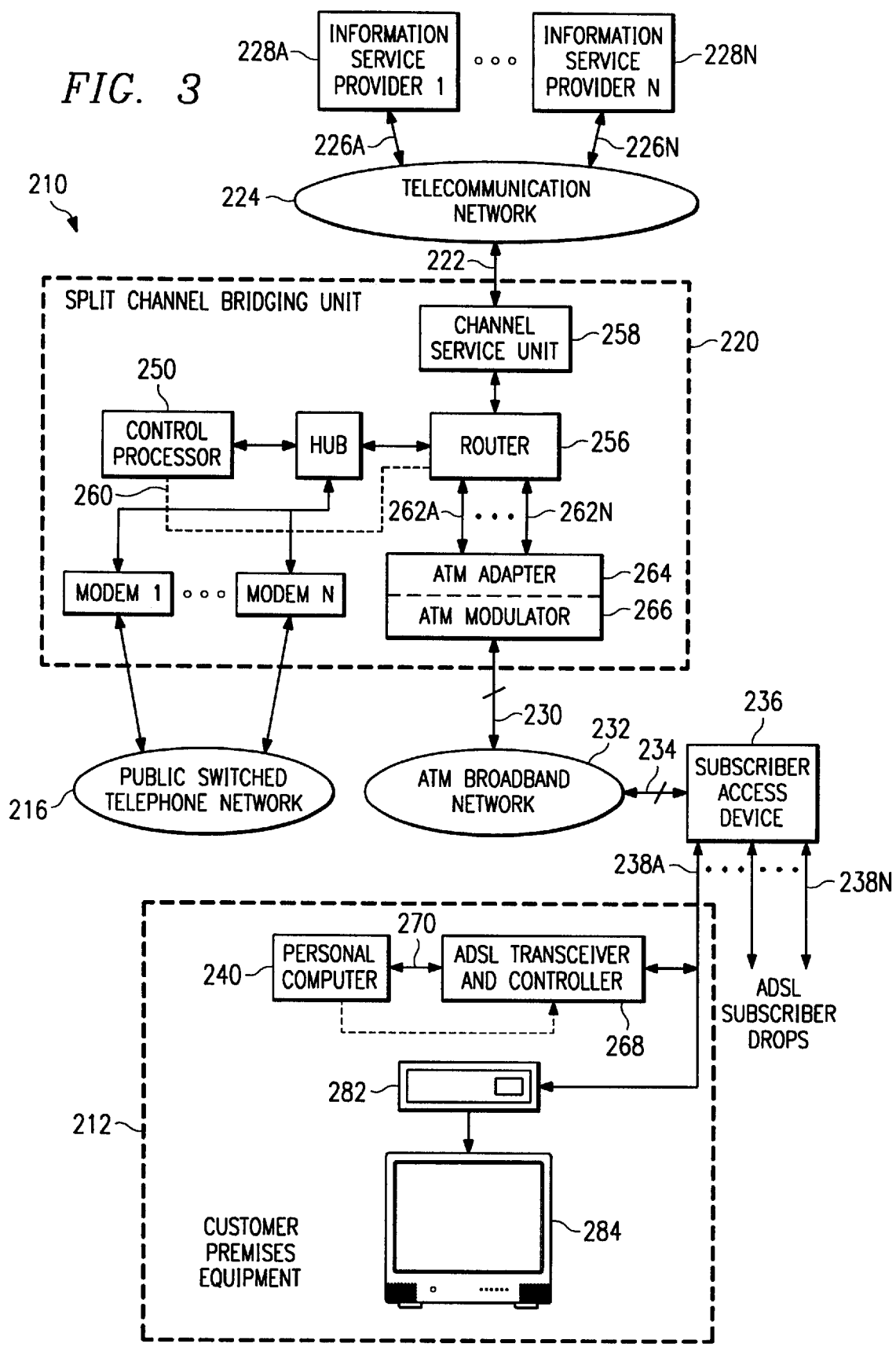

APPARATUS AND METHOD FOR BIDIRECTIONAL DATA TRANSFER

TECHNICAL FIELD OF THE INVENTION

This invention relates in general to the field of communication systems and more particularly to an apparatus and method for providing bidirectional data transfer over a broadband network between personal computer users and information service providers.

BACKGROUND OF THE INVENTION

Personal computer users utilize computer networks such as the Internet to receive selected information from a variety of information service providers. It is often desirable for users to establish connections with these information service providers to facilitate acquisition of specific desired information.

A known technique for providing information responsive to users' requests is to establish modem connections between the user's personal computer and an information service provider. Bidirectional data transfer via modems across a public switched telephone network typically occurs at rates of less than 30 kilobits per second. Given the enormous amounts of data required to transfer high resolution video and audio signals, dial-up modems prove too slow for today's multimedia environment.

Another approach is to utilize cable television systems, rather than public switched telephone networks, to carry signals from the information service providers to the users. While this approach provides increased downstream signaling speed, it fails to provide increased speed in upstream users' requests. Existing cable television systems are primarily designed for one-way communications from the cable distribution ends to cable television subscribers. In those cable television systems which provide upstream signaling, the upstream channel is often inadequate to support a plurality of users contending for use of the upstream channel. As a result, such systems continue to depend on low speed modem connections over public switched telephone networks for upstream user requests.

SUMMARY OF THE INVENTION

From the foregoing, it may be appreciated that a need has arisen for a communication system that provides high speed data transfer between users' customer premises equipment and information service providers with respect to both upstream user requests and downstream responses to these requests. In accordance with the present invention, an apparatus and method for bidirectional data transfer are provided that substantially eliminate or reduce disadvantages and problems associated with conventional information service provider communications.

According to one aspect of the present invention, a telecommunication system for bidirectional data transfer includes a channel service unit operable to receive packets of data from the information service providers, wherein each packet of data has a destination address associated with the customer premises equipment making the request. The system further includes a router operable to segregate the packets of data received from the channel service unit based on which customer premises equipment are destined to receive the packets of data. An asynchronous transfer mode (ATM) adapter receives the packets of data from the router and converts the packets of data to an ATM cell. An ATM modulator receives the ATM cell and synchronizes it to facilitate transport across an ATM broadband network.

The present invention provides various technical advantages over conventional information service provider communications. For example, one technical advantage includes facilitating upstream as well as downstream signaling across an ATM broadband network. Another technical advantage is to leverage the local phone companies' existing installed copper plant to economically provide high speed bidirectional data transfer. Yet another technical advantage is to allow information service providers to leverage their existing equipment investment by having them evolve away from modem connections on a subscriber-by-subscriber basis, rather than forcing one broad, expensive technology interchange. Still another technical advantage is that information service providers may implement the present invention with minimal hardware and software modifications. A further technical advantage is that traffic usage statistics are readily available to information service providers and phone companies. This enables management of any desired revenue sharing/customer billing scheme for this new form of subscriber traffic. Other technical advantages are readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2 is a block diagram of a communication system according to an alternative embodiment of the present invention; and FIG. 3 is a block diagram of a communication system according to another alternative embodiment of the present invention.

DETAILED DESCRIPTION OF THE INVENTION

Figure 1:
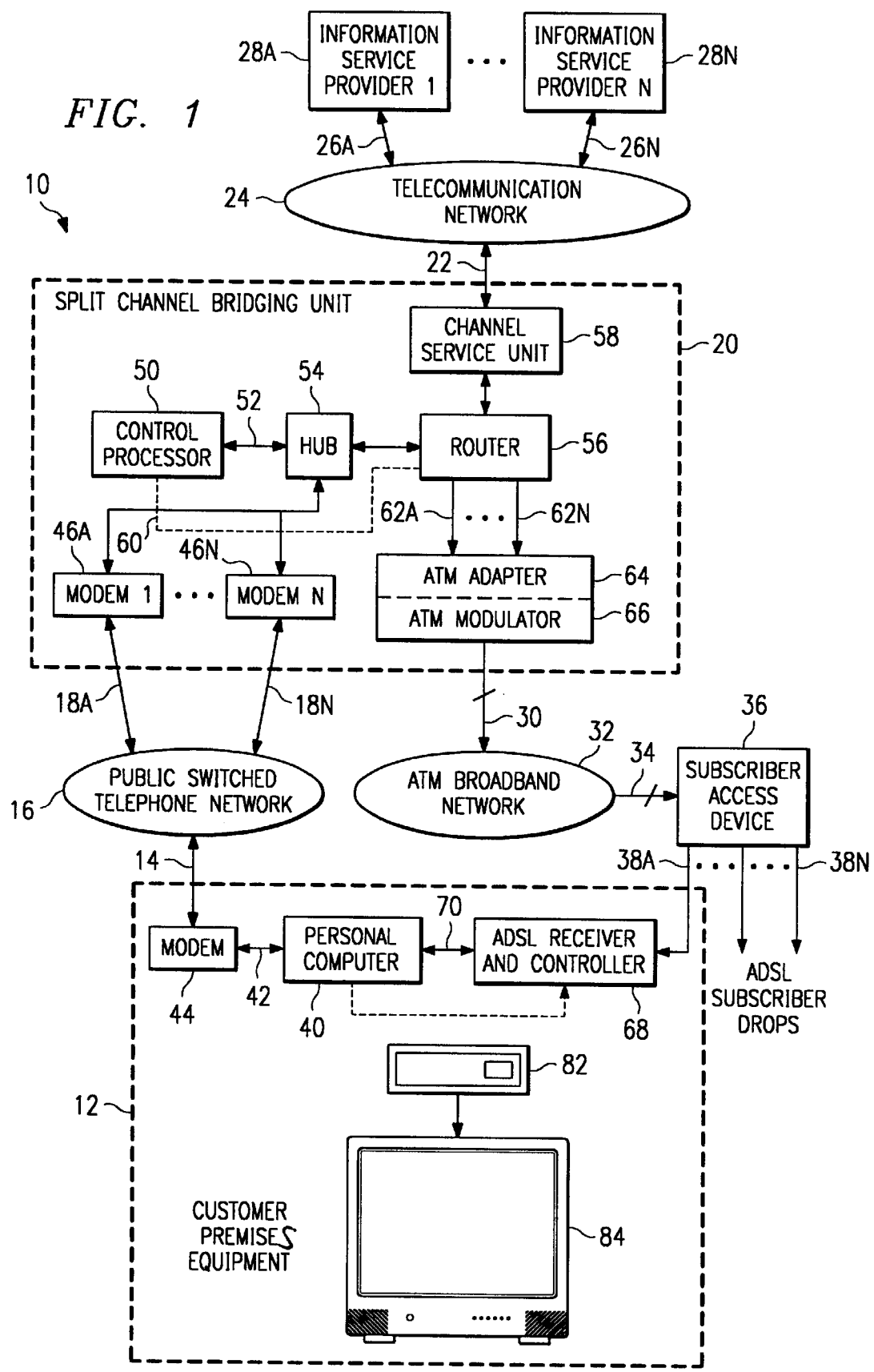
FIG. 1 is a block diagram of a communication system according to one embodiment of the present invention.

Referring to FIG. 1, a simplified block diagram of a communication system 10 is shown to illustrate a possible operating environment of the present invention. Communication system 10 includes customer premises equipment 12. Subscribers may utilize customer premises equipment 12 to transmit requests for information and/or services to information service providers 28A–28N, referred to generally as information service provider 28. Information service providers 28 may then transmit packets of data to customer premises equipment 12 in response to the subscribers' requests.

In accordance with one embodiment of the present invention, a subscriber may transmit an information request from customer premises equipment 12 to a split channel bridging unit 20 over a public switched telephone network 16. Communication channel 14 provides communications between customer premises equipment 12 and public switched telephone network 16; likewise, communication channels 18A–18N provide communication between public switched telephone network 16 and split channel bridging unit 20. Split channel bridging unit 20 may access information service provider 28 through a telecommunication network 24. A high speed communication channel 22 couples split channel bridging unit 20 and telecommunication network 24; likewise, high speed communication channels 26A–26N provide communication between telecommunication network 24 and information service providers 28A–28N. Information service provider 28 may comprise any device, system, or network suitable to provide information and/or services in response to a user's request. High speed communication channels 22 and 26A–26N may comprise any communication channels suitable to support users' requests for information and/or services, as well as information and/or services provided in response to the users' requests. Communication channels 22 and 26A–26N may be, for example, T1, T3, SMDS, SONET, or ATM channels.

Information service providers 28 may transmit packets of data in response to users' requests received from customer premises equipment 12. Each packet of data may contain a destination address associated with the customer premises equipment 12 requesting the particular packet of data. The packets of data are transmitted over telecommunication network 24 to split channel bridging unit 20. Split channel bridging unit 20 translates the packets of data received from information service provider 28 into a form suitable for transmission over an asynchronous transfer mode (ATM) broadband network 32. Communication channel 30 provides a connection between split channel bridging unit 20 and ATM broadband network 32. A communication channel 34 couples ATM broadband network 32 to a subscriber access device 36. Subscriber access device 36 may be any device suitable to facilitate user access to ATM broadband network 32, such as a digital loop carrier. Communication channels 30 and 34 may be public or private user-to-network interfaces (UNI). Subscriber access device 36 serves as the access point for subscribers with the public switched network. Customer premise equipment 12 is coupled to subscriber access device 36 through an asynchronous digital subscriber line (ADSL) 38. ADSLs 38A–38N serve as subscriber drops, facilitating connection of a plurality of customer premises equipment 12 to subscriber access device 36.

A subscriber may utilize customer premises equipment 12 to initiate communication with and request specific information from information service providers 28. Customer premises equipment 12 may include a personal computer. 40 which serves as a user interface to communication system 10. Personal computer 40 may be connected to a modem 44 through a communication channel 42. The subscriber may initiate an information request by establishing a dial-up link between modem 44 and modems 46A–46N of split channel bridging unit 20. Modems 44 and 46A–44N access public switched telephone network 16 through communication channels 14 and 18A–N, respectively.

Modems 46A–46N may be coupled to a control processor 50 by a bidirectional communication network 52, such as an ETHERNET network, which may utilize a hub 54. Control processor 50 controls the transmission of the user request data transmitted by modems 46A–46N over ETHERNET network 52. Control processor 50 may allow the transmission of the user's request to be passed to a router 56, which in turn relays the user's request to a channel service unit 58 and on to the information service provider 28 associated with the particular user request.

Upon receiving a user's request, information service provider 28 may transmit a plurality of packets of data responsive to the user's request. Information service provider 28 transmits the packets of data over high speed communication lines 26, through telecommunication network 24, over high speed communication line 22 to split channel bridging unit 20. Channel service unit 58 receives the packets of data from communication channel 22, and passes the packets of data to router 56. Router 56 operates under the control of control processor 50, through a communication link 60, to route the packets of information to an ATM adapter 64. A communication link 62A–62N, referred to generally as communications link 62, couples router 56 and ATM adapter 64. Communications link 62 may comprise an N:1 concentrated ETHERNET network. In that case, ATM adapter 64 includes a multiplexer operable to select an appropriate communication channel 62 from the N channels received from router 56. In another embodiment, communications link 62 may be a fast ETHERNET network.

ATM adapter 64 operates to perform adaptation into ATM cell format of the packets of data received from router 56. The packets of data are translated into data ATM cells to facilitate transmission over ATM broadband network 32. ATM adapter 64 is coupled to an ATM modulator 66, which operates to synchronize the data ATM cell received from ATM adapter 64, further facilitating transmission of the data ATM cell over ATM broadband network 32. Once synchronized, the data ATM cell is transmitted across ATM broadband network 32 and received by subscriber access device 36. Customer premises equipment 12, which initiated the user's request, then receives the data ATM cell from subscriber access device 36. Specifically, an asynchronous digital subscriber line (ADSL) receiver/controller 68 receives the data ATM cell from subscriber access device 36. Controller 68 translates the data ATM cell into a form suitable for reception by personal computer 40. Personal computer 40 is coupled to controller 68 by a communications link 70. Communications link 70 may be any type of link to include an ETHERNET network.

FIG. 2 illustrates another embodiment of a communication system 110 according to the present invention in which at least some of the users' requests to information service providers 128A–128N are transmitted across an ATM broadband network 132. As in the embodiment illustrated in FIG. 1, communication system 110 includes customer premise equipment 112 from which a subscriber may initiate a request for information and/or services from information service providers 128A–128N, referred to generally as information service provider 128. A subscriber may use a personal computer 140 to initiate the information request by establishing a connection between dial-up modems 144 and 146A–N across a public switched telephone network 116. Modem 144 is coupled to personal computer 140 and public switched telephone network 116 by communication channels 142 and 114, respectively. Modems 146A–146N are coupled to public switched telephone network 116 by communication channels 118A–118N, respectively. Modems 146A–146N may be coupled to a control processor 150 by a bi-directional communication network 152, which may utilize a hub 154. A split channel bridging unit 120 may receive the user's request from public switched telephone network 116, and pass the user's request to information service provider 128 via a telecommunication network 124.

In addition to transmitting user's requests across public switched telephone network 116 to information service providers 128, the present invention also facilitates transmission of user's requests over an ATM broadband network 132 to information service providers 128. In this mode of operation, the subscriber transmits a user's request from personal computer 140 to an ADSL transceiver/controller 168. Controller 168 translates the user's request into a form suitable for transmission over ATM broadband network 132. Specifically, controller 168 converts the user's request into a user's request ATM cell, and transmits the user's request ATM cell to a subscriber access device 136. Subscriber access device 136 receives the user's request ATM cell and transmits it to split channel bridging unit 120 via ATM broadband network 132. An ATM modulator 166 receives the user's request ATM cell from ATM broadband network 132, demodulates it, and passes it to an ATM adapter 164. ATM adapter 164 translates the demodulated user's request ATM cell into a form suitable for transmission through router 156 and channel service unit 158. The user's request is then transmitted to telecommunication network 124 over communication channel 122 and over one of communication channels 126A–N to information service provider 128, allowing information service provider 128 to respond to the user's request.

As in the previous embodiment, information service provider 128 may transmit a plurality of packets of data which are responsive to the user's request. These packets of data are transmitted over telecommunication network 124 to split channel bridging unit 120. Split channel bridging unit 120 includes a channel service unit 158, which is coupled to telecommunication network 124 by a communication channel 122. Channel service unit 158 receives the packets of data and passes them to a router 156. Router 156 operates under the control of a control processor 150, through a communication link 160, to route the packets of data to ATM adapter 164. A communication link 162A–162N, referred to generally as communication link 162, couples router 156 and ATM adapter 164. Communication link 162 may comprise an N:1 concentrated ETHERNET network. In that case, ATM adapter 164 includes a multiplexer operable to select an appropriate communication channel 162 from the N channels received from router 156. In an alternative embodiment, communication link 162 may be a fast ETHERNET network.

ATM adapter 164 operates to perform adaptation into ATM cell format of the packets of data received from router 156. The packets of data are translated into data ATM cells to facilitate transmission over an ATM broadband network 132. ATM adapter 164 is coupled to ATM modulator 166, which operates to synchronize the data ATM cell received from ATM adapter 164. ATM modulator 166 modulates the data ATM cell into, for example, DS-3 or SONET OC-n physical layer for transport across ATM broadband network 132. Upon synchronization, the data ATM cell is transmitted over ATM broadband network 132, and received by a subscriber access device 136. ATM modulator 164 and subscriber access device 136 are coupled to ATM broadband network 132 by communication channels 130 and 134, respectively. Subscriber access device 136 then passes the data ATM cell to the customer premises equipment that initiated the user's request. Specifically, an ADSL transceiver/controller 168 receives the data ATM cell and converts it to a form suitable for use by a personal computer 140. Personal computer 140 and controller 168 are coupled by a communication link 170, which may be an ETHERNET network.

FIG. 3 illustrates yet another embodiment of a communication system 210 according to the present invention. In this embodiment, users' requests are transmitted from customer premises equipment 212 to information service providers 228A–228N across an ATM broadband network 232 without going through public switched telephone network 216. Information service providers 228A–228N, referred to generally as information service providers 228, may send responsive packets of data across ATM broadband network 232 to customer premises equipment 212.

A subscriber may utilize a personal computer 240 to initiate a user's request to information service providers 228. Personal computer 240 is coupled to an ADSL transceiver/controller 268 by a communication link 270. Communication link 270 may be, for example, an ETHERNET network. Controller 268 receives the user's request from personal computer 240 and translates the user's request into a user's request ATM cell suitable for transmission over ATM broadband network 232. Controller 268 transmits the user's request ATM cell through a communication link 238A to a subscriber access device 236. Subscriber access device 236 allows subscribers to access ATM broadband network 232. Subscriber access device 236 passes user's request ATM cell across ATM broadband network 232 to an ATM modulator 266. Subscriber access device 236 is coupled to ATM broadband network 232 by a communication link 234; likewise, ATM broadband network 232 is coupled to ATM modulator 266 by a communication link 230. Communication links 230 and 234 may be public or private UNIs. ATM modulator 266 receives the user's request ATM cell, demodulates it and passes it to an ATM adaptor 264. ATM adaptor 264 receives the demodulated user's request ATM cell and translates it to a form suitable for transmission to router 256 and channel service unit 258. The user's request is then transmitted to a telecommunication network 224 over communication channel 222 and over one of communication channels 226A–N to information service providers 228.

Upon receipt of the user's request, information service provider 228 may transmit a plurality of packets of data which are responsive to the user's request. These packets of data are transmitted over telecommunication network 224 to a split channel bridging unit 220. A channel service unit 258, which is coupled to telecommunication network 224 by a communication channel 222, receives the packets of data and passes them to a router 256. Router 256 operates under the control of a control processor 250, through a communication link 260, to route the packets of data to ATM adaptor 264. A communication link 262A–262N, referred to generally as communication link 262, couples router 256 and ATM adaptor 264. Communication link 262 may comprise an N:1 concentrated ETHERNET network. In that case, ATM adaptor 264 includes a multiplexer operable to select an appropriate communication channel from the N channels received from router 256. In another embodiment, communication link 262 may comprise a fast ETHERNET network.

ATM adaptor 264 operates in a similar manner to ATM adaptors 64 and 164 in FIGS. 1 and 2, respectively. Likewise, ATM modulator 266 operates in a like manner to ATM modulators 66 and 166 in FIGS. 1 and 2, respectively. ATM adaptor 264 and ATM modulator 266 convert the packets of data into a data ATM cell and pass the data ATM cell to subscriber access device 236 across ATM broadband network 232. Subscriber access device 236 receives the data ATM cell and routes it to the customer premises equipment associated with the data ATM cell. Controller 268 may receive the data ATM cell and translate it to a form suitable for reception by personal computer 240. Alternatively, set top box 282 may receive the data ATM cell. Set top box 282 may operate to provide video services to a television 284.

Thus, it is apparent that there has been provided, in accordance with the present invention, an apparatus and method for bidirectional data transfer that satisfies the advantages set forth above. Although the present invention has been described in detail, it should be understood that various changes, substitutions, and alterations readily ascertainable by those skilled in the art can be made herein without departing from the spirit and scope of the present invention as defined by the following claims.

What is claimed is:

1. A telecommunication system that supports communication between users and information service providers by transporting information to the users' customer premises equipment in response to users' request from the users' customer premises equipment, the system comprising:

a channel service unit operable to receive packets of data from the information service providers, wherein each packet of data has a destination address associated with a customer premises equipment;

a router operable to segregate the packets of data received from the channel service unit based on which customer premises equipment are destined to receive the packets of data;

an ATM adapter operable to convert the packets of data received from the router to at least one data ATM cell; and an ATM modulator operable to receive the data ATM cell and synchronize it to facilitate transport across an ATM broadband network;

wherein the communications link coupling the router and the ATM adapter comprises a fast Ethernet network, the ATM adapter operable to perform Ethernet-to-ATM adaptation on the packets of data received.

2. The system of claim 1, wherein the packets of data are transmitted from the information service providers to the customer premises equipment in response to the user's request from the customer premises equipment.

3. The system of claim 1, wherein the user's request is transmitted from the customer premises equipment to the information service providers through a transmission medium physically separate from the ATM broadband network.

4. The system of claim 1, wherein the user's request is transmitted from the customer premises equipment to the information service providers through the ATM broadband network.

5. The system of claim 1, further comprising:

a subscriber access device operable to receive the data ATM cell and deliver it to its associated customer premises equipment; and a controller for receiving the data ATM cell and translating the data ATM cell into a form suitable for reception by a user's personal computer at the customer premises equipment.

6. The system of claim 5, wherein the subscriber access device comprises a digital loop carrier system.

7. The system of claim 5, wherein the controller comprises an ADSL transceiver operable to receive the data ATM cell and translate the data ATM cell into a form suitable for reception at the user's personal computer, the ADSL transceiver further operable to translate one or more of the users' requests into a form suitable for transmission back to the information service providers, and to transmit the users' requests to the information service providers through the ATM broadband network.

8. The system of claim 7, wherein:

the ADSL transceiver is operable to receive the user's request and to translate it into a user's request ATM cell, the ADSL transceiver further operable to transmit the user's request ATM cell to the subscriber access device;

the subscriber access device is operable to receive the user's request ATM cell from the ADSL transceiver and to transmit the user's request ATM cell through the ATM broadband network to the ATM modulator;

the ATM modulator is operable to receive and to demodulate the user's request ATM cell; and the ATM adapter is operable to receive and to convert the demodulated user's request ATM cell to a form suitable for transmission to the information service provider.

9. A telecommunication system that supports communication between users and information service providers by transporting information to the users' customer premises equipment in response to users' requests from the users' customer premises equipment, the system comprising:

a channel service unit operable to receive packets of data from the information service providers, wherein each packet of data has a destination address associated with a customer premises equipment;

a router operable to segregate the packets of data received from the channel service unit based on which customer premises equipment are destined to receive the packets of data;

an ATM adapter operable to convert the packets of data received from the router to at least one data ATM cell; and an ATM modulator operable to receive the data ATM cell and synchronize it to facilitate transport across an ATM broadband network;

wherein the communications link coupling the router and the ATM adapter comprises an N:1 concentrated Ethernet network, the ATM adapter comprising a multiplexer operable to select an appropriate communications channel from the N channels received, the ATM adapter further operable to perform Ethernet-to-ATM adaptation on the packets of data received.

10. A telecommunication system that supports communication between users and information service providers by transporting information to the users' customer premises equipment in response to users' requests from the users' customer premises equipment, the system comprising:

a channel service unit operable to receive packets of data from the information service providers, wherein each packet of data has a destination address associated with a customer premises equipment;

a router operable to segregate the packets of data received from the channel service unit based on which customer premises equipment are destined to receive the packets of data;

an ATM adapter operable to convert the packets of data received from the router to at least one data ATM cell; and an ATM modulator operable to receive the data ATM cell and synchronize it to facilitate transport across an ATM broadband network;

a subscriber access device operable to receive the data ATM cell and deliver it to its associated customer premises equipment; and a controller for receiving the data ATM cell and translating the data ATM cell into a form suitable for reception by a user's personal computer at the customer premises equipment;

wherein the communication link coupling the router and the ATM adapter comprises an N:1 concentrated Ethernet network, the ATM adapter comprising a multiplexer operable to select an appropriate communication channel from the N channels received, the ATM adapter further operable to perform Ethernet-to-ATM adaptation on the packets of data received.

11. A telecommunication system that supports communication between users and information service providers by transporting information to the users' customer premises equipment in response to users' requests from the users' customer premises equipment, the system comprising:

a channel service unit for supporting the receipt of packets of data from the information service providers, wherein each packet of data has a destination address associated with a users' customer premises equipment;

a router coupled to the channel service unit, the router operable to segregate the packets of data received from the channel service unit based on which customer premises equipment is destined to receive the packets of data;

an ATM adapter coupled to the router, the ATM adapter operable to convert the packets of data received to at least one data ATM cell;

an ATM modulator coupled to the ATM adapter, the ATM modulator operable to receive the data ATM cell and synchronize it to facilitate transport across an ATM broadband network;

a subscriber access device coupled to the ATM broadband network for receiving the data ATM cell and delivering it to its associated user; and a controller for receiving the data ATM cell and translating the data ATM cell into a form suitable for reception by a user's personal computer at the customer premises equipment;

wherein the communication link coupling the router and the ATM adapter comprises a fast Ethernet network, the ATM adapter operable to perform Ethernet-to-ATM adaptation on the packets of data received.

12. The system of claim 11, wherein the packets of data are transmitted from the information service providers to the customer premises equipment in response to the user's request from the customer premises equipment.

13. The system of claim 11, wherein the user's request is transmitted from the customer premises equipment to the information service providers through a transmission medium physically separate from the ATM broadband network.

14. The system of claim 11, wherein the user's request is transmitted from the customer premises equipment to the information service providers through the ATM broadband network.

15. The system of claim 11, wherein the subscriber access device comprises a digital loop carrier system.

16. The system of claim 11, wherein the controller comprises an ADSL transceiver and controller operable to receive the data ATM cell and translate the data ATM cell into a form suitable for reception at the user's personal computer, the ADSL transceiver and controller further operable to translate the user's request into a form suitable for transmission back to the information service providers, and to transmit the user's request over the ATM broadband network to the information service providers.

17. A telecommunication system that supports communication between users and information service providers by transporting information to the users' customer premises equipment in response to users' requests from the users' customer premises equipment, the system comprising:

a channel service unit for supporting the receipt of packets of data from the information service providers, wherein each packet of data has a destination address associated with a users' customer premises equipment;

a router coupled to the channel service unit, the router operable to segregate the packets of data received from the channel service unit based on which customer premises equipment is destined to receive the packets of data;

an ATM adapter coupled to the router, the ATM adapter operable to convert the packets of data received to at least one data ATM cell;

an ATM modulator coupled to the ATM adapter, the ATM modulator operable to receive the data ATM cell and synchronize it to facilitate transport across an ATM broadband network;

a subscriber access device coupled to the ATM broadband network for receiving the data ATM cell and delivering it to its associated user; and a controller for receiving the data ATM cell and translating the data ATM cell into a form suitable for reception by a user's personal computer at the customer premises equipment;

wherein the communication link coupling the router and the ATM adapter comprises an N:1 concentrated Ethernet network, the ATM adapter comprising a multiplexer operable to select an appropriate communication channel from the N channels received, the ATM adapter further operable to perform Ethernet-to-ATM adaptation on the packets of data received.

* * * * *